United States Patent
Ashie et al.

(10) Patent No.: US 6,849,284 B2
(45) Date of Patent: Feb. 1, 2005

(54) MEAT TENDERIZATION WITH A THERMOLABILE PROTEASE

(75) Inventors: Isaac Ashie, Raleigh, NC (US);
Thomas Sorensen, Raleigh, NC (US);
Per Munk Nielsen, Hillerod (DK)

(73) Assignees: Novozymes A/S, Bagsvaerd (DK);
Novozymes North America, Inc.,
Franklinton, NC (US)

( * ) Notice: Subject to any disclaimer, the term of this patent is extended or adjusted under 35 U.S.C. 154(b) by 0 days.

(21) Appl. No.: 10/773,534

(22) Filed: Feb. 5, 2004

(65) Prior Publication Data

US 2004/0161494 A1 Aug. 19, 2004

Related U.S. Application Data

(63) Continuation of application No. 10/041,080, filed on Apr. 18, 2002, now abandoned, which is a continuation of application No. 09/620,494, filed on Nov. 20, 2000, now abandoned, which is a continuation-in-part of application No. 09/358,792, filed on Jul. 22, 1999, now Pat. No. 6,149,950.

(51) Int. Cl.$^7$ .................................................. A23L 1/31
(52) U.S. Cl. ............................ 426/56; 426/58; 426/652
(58) Field of Search ........................... 426/56, 63, 652, 426/58, 59; 435/212, 219, 220, 223, 184

(56) References Cited

U.S. PATENT DOCUMENTS

| | | | | | |
|---|---|---|---|---|---|
| 3,399,065 | A | * | 8/1968 | Wistreich et al. | 426/42 |
| 4,591,565 | A | * | 5/1986 | Branner-Jorgensen et al. | 435/223 |
| 4,600,589 | A | * | 7/1986 | Robbins et al. | 426/56 |
| 6,103,512 | A | * | 8/2000 | Venema et al. | 435/219 |

FOREIGN PATENT DOCUMENTS

EP  0 362 177  *  4/1990

OTHER PUBLICATIONS

Bender, A. Dictionary of Nutrition and Food Technology. Butterworth & Co., Publishers. pp. 65 and 243. Jan. 1990.*

* cited by examiner

*Primary Examiner*—Keith Hendricks
(74) *Attorney, Agent, or Firm*—Elias J. Lambiris; Jason I. Garbell

(57) ABSTRACT

The present invention relates to methods for tenderizing meat comprising contacting meat with a tenderizing-effective amount of a thermolabile protease having limited substrate specificity, wherein the limited substrate specificity is the digestion of only one of the two major protein components of meat.

20 Claims, 3 Drawing Sheets

MEAT TENDERIZATION WITH A THERMOLABILE PROTEASE

CROSS-REFERENCE TO RELATED APPLICATIONS

This application is a continuation of U.S. application Ser. No. 10/041,080, filed Apr. 18, 2002, now abandoned, which is a continuation of U.S. application Ser. No. 09/620,494, filed Nov. 20, 2000, now abandoned, which is a continuation-in-part of U.S. application Ser. No. 09/358,792 (now U.S. Pat. No. 6,149,950), filed on Jul. 22, 1999, the contents of which are fully incorporated herein by reference.

FIELD OF THE INVENTION

The present invention relates to methods and compositions for meat tenderization employing thermolabile enzymes having limited specificity.

BACKGROUND OF THE INVENTION

Tenderness is a major quality attribute that affects market price and consumer acceptance of meat products. The lack of consistency of beef tenderness is a major reason for decreased beef consumption in the U.S. There are several methods for improving meat tenderness, including mechanical tenderization, elevated temperature storage, calcium chloride injection, electrical stimulation, muscle stretching, shock-wave pressure, dry and wet aging, and enzymatic treatment. One of the most widely used is treatment with an enzyme, such as, e.g., papain, bromelain, or ficin. These enzymes, however, have very broad specificities and therefore hydrolyze indiscriminately the major meat proteins (connective tissue/collagen and myofibrillar proteins) resulting in an over-tenderized (i.e., mushy) product. Furthermore, papain, which is the most widely used, is relatively heat-stable, allowing uncontrolled texture deterioration during and after cooking.

Thus, there is a need in the art for meat tenderization methods employing enzymes which, unlike papain, have narrow substrate specificity; express self-limiting hydrolysis of meat proteins; hydrolyze either of the two major meat protein components, but not both; are thermolabile and thereby readily inactivated at cooking temperatures; and have no adverse effect on flavor.

SUMMARY OF THE INVENTION

The present invention provides methods for tenderizing meat, which are carried out by contacting meat with a solution comprising a tenderizing-effective amount of a thermolabile protease. Preferably, the protease has a limited substrate specificity so that it (a) digests meat proteins to only a limited extent and/or (b) digests only one of the two major protein components of meat. In some embodiments, the protease is derived from a Rhizomucor species, preferably R. miehei. In some embodiments, the protease is derived from a mammal, such as, e.g., bovine chymosin. The protease may be isolated directly from R. miehei cells or, alternatively, from recombinant host cells transformed with nucleic acid encoding the protease. Preferably, the protease is treated with peroxy acids to render it more thermolabile.

The contacting step comprises, without limitation, injection of meat; marination; or injection of an animal prior to slaughter, and may also include tumbling the contacted meat in the tenderizing solution. Typically, meat is contacted with the protease at a weight ratio of between about 0.001 and about 0.1 AU/100 g meat, preferably between about 0.005 and about 0.05 AU/100 g meat.

The methods of the invention provide tenderized meat that exhibits a relative shear force (as measured by the Warner-Bratzler method) that is between about 50% and about 90%, preferably between about 60% and about 80%, of the relative shear force of the meat prior to tenderization.

In another aspect, the invention provides tenderized meat products produced using the methods described herein.

In yet another aspect, the invention provides meat tenderizing compositions comprising a thermolabile protease having limited substrate specificity and one or more of brine, curing agents, and flavoring agents.

DETAILED DESCRIPTION OF THE INVENTION

Figure 1:
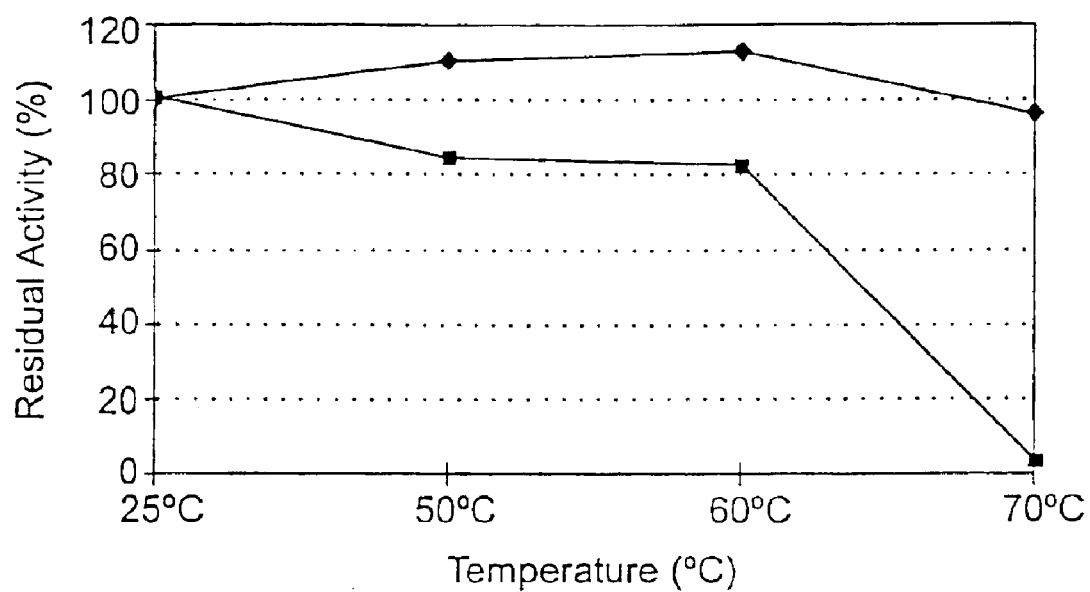
FIG. 1 is a schematic representation of the thermolabile of thermolabile R. miehei protease (diamond symbols) and papain (box symbols).

The present invention provides methods and compositions for tenderizing meat. The invention is based on the discovery that treating meat with thermolabile proteases having limited substrate specificity results in meat that exhibits superior properties relative to untenderized meat or to meat treated with conventional tenderizing enzymes such as, e.g., papain.

Proteases:

As used herein, a thermolabile protease refers to a protease whose enzymatic activity is expressed at reduced levels at high temperatures, such as, e.g., above about 50° C., due to (a) thermolabile of the enzymatic reaction catalyzed by the protease and/or (b) structural thermolabile of the protease itself. According to the invention, a thermolabile protease exhibits less than about 75%, preferably less than about 50%, more preferably less than about 25%, and most preferably less than about 10%, of its maximal enzymatic activity when the enzymatic reaction is carried out at a temperature of at least about 70° C., preferably at least about 60° C. and more preferably at least about 50° C. Alternatively, or in combination with the above, a thermolabile protease is a protease whose activity declines to less than about 75%, preferably less than about 50%, more preferably less than about 25%, and most preferably less than about 10%, of its maximal enzymatic activity after incubation for 5–30 min at a temperature of at least about 70° C., preferably at least about 60° C., and more preferably at least about 50° C., when enzymatic activity is measured at the temperature at which the untreated enzyme normally exhibits its maximal activity.

As used herein, a protease having limited substrate specificity is one that recognizes only a subset of amino acids within a particular polypeptide as targets for proteolytic attack. Proteases having limited substrate specificity that are useful in practicing the present invention include, without limitation, those that (a) digest either or both of the meat protein components to a degree of hydrolysis (DH) of less than about 10%, preferably less than about 5%, and most preferably less than about 2%, and/or (b) digest only one of the two major protein components of meat, when meat is contacted as described, e.g., in Example 2 below. DH may be measured using any method known in the art, including, without limitation, measuring free amino groups using the OPA (o-phthaldialdehyde) method (Church et al., *Anal. Biochem.* 146:343, 1985) (see, Example 3 below); measuring a decrease in pH; and measuring an increase in osmolality. Methods for comparing hydrolysis of collagen and myofibrillar proteins are described, e.g., in Example 4 below.

Proteases for use in the present invention may comprise wild-type or mutant enzymes. The enzymes may be isolated from their cell of origin or may be recombinantly produced using conventional methods well-known in the art. The only requirement is that the protease exhibit thermolabile and, preferably, limited substrate specificity and be capable of exerting a tenderizing effect on meat as described herein.

In one embodiment, the protease used in practicing the present invention is derived from a *Rhizomucor* species, including, without limitation, *Rhizomucor miehei* or *Rhizomucor pusillus*, preferably *R. miehei*. The sequence of *R. miehei* protease is disclosed in U.S. Pat. No. 5,800,849.

In another embodiment, the protease used in practicing the present invention is derived from a mammal, such as, e.g., bovine chymosin (which is commercially available from, e.,g., Chr. Hansen, A/S, Denmark)

The enzyme may be inherently thermolabile or may be rendered thermolabile by any means known in the art, including, without limitation, chemical or other treatments of the native enzyme, or by introduction of mutations into the sequence of the enzyme that result in enhanced thermolabile. In some embodiments, *R. miehei* protease is rendered more thermolabile by treatment with oxidizing agents containing active chlorine (U.S. Pat. No. 4,357,357) or aliphatic or inorganic peroxy acids (U.S. Pat. No. 4,591,565).

Methods for Tenderizing Meat:

The present invention provides methods for tenderizing meat that comprise contacting meat with a solution comprising a tenderizing-effective amount of a thermolabile protease. In preferred embodiments, the protease has a limited substrate specificity.

As used herein, "meat" encompasses, without limitation, meat muscle, whether present in a live animal or carcass or in fresh meat obtained from butchering, as well as frozen meat, freeze-dried meat, and restructured meat in any form.

Tenderizing refers to a process by which the texture of meat is rendered more chewable or otherwise more acceptible to the consumer. Tenderization is typically assessed by measuring the relative shear force of the meat or by sensory evaluation. Relative shear force may be measured using the Warner-Bratzler method (Olson et al., *J. Food Sci.* 42:506, 1977; and Fogle et al., *J. Food Sci.* 47:1113, 1982). In this method, meat samples are carved into cylindrical shapes 0.75 cm in diameter with the axis of the cylinder along the longitudinal sections of the meat fibers. The samples are placed on a V-shaped Warner-Bratzler blade moving down at a steady speed of 2 mm/sec through a fixed distance (30–50 mm) slicing along the length of the sample. The maximum force required to slice through each sample is an indication of the shear force.

A tenderizing-effective amount of a protease is an amount that results in a reduction of relative shear force to between about 50–90%, preferably between about 60–80%, of the relative shear force exhibited by untreated meat.

In practicing the invention, meat is contacted with the enzyme at a ratio (by weight) of between about 0.001 and about 0.1 Anson Units (AU)/100 g meat, preferably between about 0.0025 and about 0.05 AU/100 g meat and most preferably between about 0.005 and about 0.05 AU/100 g meat. One AU is defined as the amount of enzyme which digests denatured hemoglobin at 25° C., pH 7.5 in 10 min, at an initial rate that liberates an amount of trichloroacetic acid-soluble material that is equivalent to one milliequivalent of tyrosine, when measured by color production using a phenol reagent.

The contacting step may comprise one or more of (a) injecting the meat directly; (b) marinating the meat; or (c) injecting a live animal prior to slaughter. It will be understood that the time during which the meat is contacted with the protease, as well as the temperature at which the meat is contacted, will depend upon the mode (or combination of modes) that is employed. For example, meat may be injected with a protease-containing solution and stored for up to about two weeks at 5° C. Alternatively, meat may be marinated for about 0.5–10 h at 5–10° C. Furthermore, the meat will be contacted with the protease during cooking.

The method may further comprise tumbling the meat in, e.g., the marinating solution, such as, e.g., for 1–3 h at 5–10° C.

It will be understood that each of the reaction conditions (such as, e.g., concentration of protease, ratio of protease:meat, mode of contacting, pH, temperature, and time) may be varied, depending upon the source of meat and/or enzyme and the degree of tenderization that is required. It will further be understood that optimization of the reaction conditions may be achieved using routine experimentation by establishing a matrix of conditions and testing different points in the matrix.

In other embodiments, the invention encompasses meat and meat products that have been tenderized using the above-described methods and compositions.

In other embodiments, the invention encompasses compositions for meat tenderization that comprise, in addition to a thermostable protease, one or more of brine, curing agents, and flavoring agents. Brine comprises, without limitation, sodium chloride, phosphates, dextrose, and other ingredients. Curing agents include, without limitation, nitrites, sugars, and erythorbate. Flavoring agents include, without limitation, herbs, spices, and liquid smoke.

The following examples are intended as non-limiting illustrations of the present invention.

EXAMPLE 1

Thermolabile of *R. miehei* Protease

The following experiment was performed to compare the thermolabile of *R. miehei* protease with that of papain, the most widely used enzyme for meat tenderization.

Enzymes were heat-treated for 30 min at 50, 60, and 70° C., after which their residual activity was determined as follows, using a Protazyme kit (Megazyme International Ireland Ltd.)

1-ml enzyme (in 100 mM disodium hydrogen phosphate, 30 mM cystein hydrochloride, 30 mM EDTA, pH 7.0) were added to 1 ml protazyme-containing buffer (100 mM disodium hydrogen phosphate, 1% w/v sodium dodecyl sulfate, pH 7.0) and incubated for 10 min at 40° C. with continuous stirring, after which the reaction was terminated by addition of 10 ml 2% (w/v) trisodium phosphate pH 12.3 with vigorous stirring. The reactions were allowed to stand at room temperature for a further 2 min, after which they were filtered through a Whatman No. 2 filter. The absorbance of the supernatant at 590 nm was measured against a substrate blank (which contained the same components, except that 1 ml of buffer was added instead of enzyme).

The results (FIG. 1) indicate that thermolabile-*R. miehei* protease rapidly loses activity at temperatures greater than 60° C.

EXAMPLE 2

Meat Tenderization Using *R. miehei* Protease

The following experiment was performed to evaluate meat tenderization using *R. miehei* protease.

Methods:

Beef (top round post rigor meat, i.e., 72 hr postmortem) was purchased from a local abattoir and used fresh. Samples were weighed and injected with enzyme solution to provide a net gain of 5% (wet meat weight) at a pressure of 50 psi with injection needles being about 1 inch apart. The meat was tumbled for 2 hr at 7 rpm in a walk-in cooler (5° C.) after which samples were sliced into portions of 1" thickness.

Samples were stored for 1 week at 5° C. and analyzed on days 1, 7, and 14, after which Warner-Bratzler shear force was measured as follows: Core samples (1" diameter) from cooked meat were subjected to Warner-Bratzler shear force in a TA-XT2Texture Analyzer and the maximum force estimated as indicator of tenderness. Test speed was 2 mm/s through a fixed distance of 30 mm.

Figure 2:
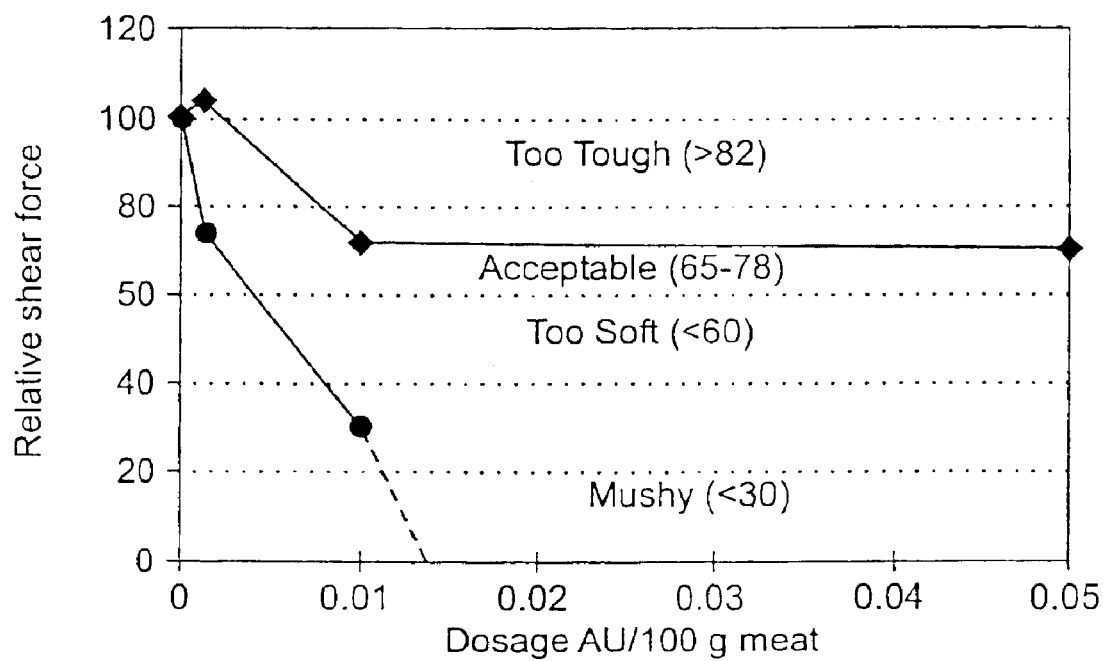
FIG. 2 is a schematic representation of the relative shear force of meat treated with thermolabile R. miehei protease (diamond symbols) and papain (circle symbols).
Figure 3:
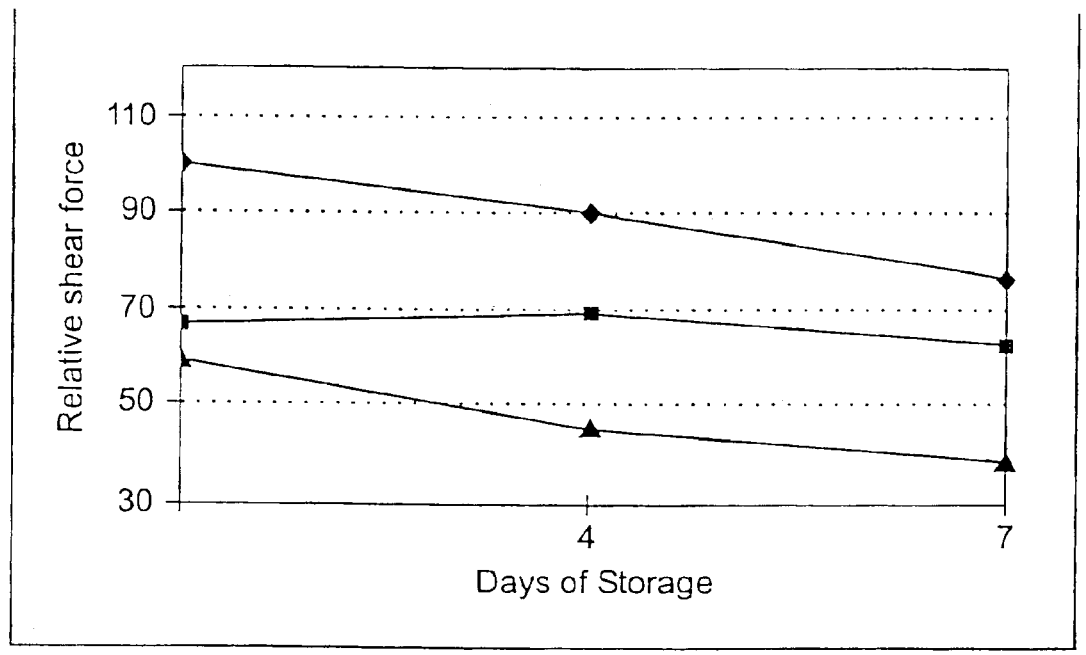
FIG. 3 is a schematic representation of the effect of refrigerated storage on the relative shear force of tenderized meat. Diamond symbols, control; box symbols, thermolabile R. miehei protease; triangle symbols, papain.

Results:

Of the two enzymes tested, papain exhibited the greater effect on beef tenderness. At the lowest concentration, papain reduced tenderness by more than 40% and reduced the meat to mush at higher concentrations, making it impossible to obtain any tenderness evaluations (FIG. 2). By contrast, thermolabile *R. miehei* protease provided an optimal level of meat tenderization. Furthermore, use of this enzyme allows refrigerated storage of tenderized meat without further hydrolytic degradation of the meat (FIG. 3).

EXAMPLE 3

Measurement of Degree of Hydrolysis (DH)

Protein hydrolysates are analyzed for DH by OPA as follows: The OPA reagent is prepared by dissolving 7.620 g di-sodium tetraborate decahydrate (Aldrich 22,133–3) and 200 mg sodium dodecyl sulphate (Sigma L-3771) in 150 ml water. 160 mg o-phthaldialdehyde 97% (Sigma P-0657) is dissolved in 4 ml ethanol and added to the mixture, brought to 200 ml with deionized water. 3 ml OPA reagent is added to a test tube, after which 400 µl serine standard or sample is added. After mixing, the mixtures are incubated for exactly 2 minutes, after which absorbance at 340 nm is measured. DH is calculated using the following formulas:

a.
$$\text{Serine NH}_2 = \frac{OD_{sample} - OD_{blank}}{OD_{standard} - OD_{blank}} * 0.9516 \text{ meq v/l} * \frac{0.1 * 100 \text{ l/g protein}}{X * P}$$

Serine NH$_2$=meqv serine NH$_2$/g protein
X=g sample
P=% protein in sample
0.1=sample volume in liters $$h = \frac{\text{Serine} - \text{NH}_2 - \beta}{\alpha} \text{meq v/g protein}$$

b.
$$DH = h/h_{tot} * 100\%$$

EXAMPLE 4

Measurement of Hydrolytic Potential of a Protease for Collagen and Myofibrils

The following experiments are performed to evaluate the relative activity of a protease on each of the two major protein components of meat.

Collagenase Activity:
1. To 20 mg collagen from bovine tendon (Sigma) suspended in 3.8 ml Tris buffer (0.02 M Tris, 0.005 M CaCl$_2$, pH 7.4) is added 200 µl collagenase (or protease) solution (1 mg/ml in Tris buffer) to make a total volume of 4.0 ml.
2. The mixture is incubated at 40° C. for 3 hr or 70° C. for 30 min.
3. The reaction mixtures are centrifuged in a microfuge for 10 min at 14,000 rpm.
4. 1.5 ml of supernatant is mixed with 4.5 ml of 5 N HCl and kept in a drying oven at 110° C. for 16 hrs (overnight) for complete hydrolysis of soluble peptides.
5. The hydrolysate is then analyzed for hydroxyproline content as follows:

Hydroxyproline Content
1. The hydrolysate is diluted 25 times with distilled water.
2. To 1.00 ml of diluted hydrolysate 1.00 ml of chloramine-T solution is added and the mixture is allowed to stand at room temperature for 20 min.
3. 1.00 ml of color reagent are added after this period and the reaction mixture is transferred to a 60° C. water bath and incubated for 15 min.
4. Tubes are removed and allowed to cool down to room temperature.
5. Absorbance at 560 nm is measured.

Myofibril Extraction (Olson et al., 1976, *J. Food Sci.* 41: 1036–1041).
1. 100 g of minced meat is homogenized for 30 sec in 10 vols (v/w) KCl-phosphate buffer (100 mM KCl, 20 mM potassium phosphate—pH 7.0) at 11,000 rpm.
2. The homogenate is centrifuged at 1,000 g for 15 min and the pellet re-suspended in 5 vols (v/w) buffer and re-centrifuged under the same conditions.
3. The pellet is again re-suspended in 5 vols buffer and poured through strainer to remove connective tissue and debris.
4. The myofibril suspension obtained is centrifuged at 1,000 g for 15 min, re-suspended, and washed twice more with buffer.
5. The myofibril extract is suspended in buffer and protein content estimated using the Leco protein analyzer.

Soluble Protein Analysis
1. To 2.9–3.0 ml myofibril extract 0–100 µl enzyme solution (1 mg protein/ml) are added, and the reaction mixtures incubated at 70° C. for 30 min.
2. The reaction is stopped by adding 1.5 ml of 15% trichloroacetic acid and allowing the mixtures to stand at room temperature for 15 min.
3. The suspension is centrifuged at 10,000 rpm for 8 min and the absorbance of the superatanat at 280 nm is measured.

Alternatively,
1. 50 µl enzyme (1 mg protein/ml) is added to 1.95 ml of myofibril extract and incubated at 70° C. for 30 min.
2. The reaction is stopped by adding 2 ml of 15% trichloroacetic acid and allowing the mixture to stand at room temperature for 15 min.
3. The suspension is centrifuged at 10,000 rpm for 8 min and the absorbance of supernatant at 280 nm is measured.

EXAMPLE 5

Thermolability of Bovine Chymosin

The following experiment was performed to test the thermolabile of bovine chymosin.

The enzyme (Chy-Max from Chris Hansen, Inc.) was heat-treated for 30 min at 55, 65, and 75° C., after which its residual activity (expressed in Anson Units using hemoglobin as a substrate) was determined using a Neutrase standard at pH 7.5.

The results indicate that bovine chymosin rapidly loses activity at temperatures greater than 60° C. and retains only 10–15% activity after heating to 75° C.

All patents, patent applications, and literature references referred to herein are hereby incorporated by reference in their entirety.

Many variations of the present invention will suggest themselves to those skilled in the art in light of the above detailed description. Such obvious variations are within the full intended scope of the appended claims.

What is claimed is:

1. A method for tenderizing meat, said method comprising contacting meat with a tenderizing-effective amount of a protease having limited substrate specificity, wherein said limited substrate specificity is the digestion of only one of the two major protein components of meat; and wherein said protease has been treated to render said protease more thermolabile.

2. A method for tenderizing meat, said method comprising contacting meat with a tenderizing-effective amount of a thermolabile protease rendered thermolabile by chemical treatment of the native enzyme.

3. A method as defined in claim 2, wherein said protease has a limited substrate specificity.

4. A method as defined in claim 2, wherein said protease is derived from a Rhizomucor species.

5. A method as defined in claim 4, wherein said Rhizomucor species is R. miehei.

6. A method as defined in claim 5, wherein said protease is treated with peroxy acids prior to said contacting.

7. A method as defined in claim 2, wherein said protease is derived from a mammal.

8. A method as defined in claim 7, wherein said mammal is bovine.

9. A method as defined in claim 8, wherein said protease is chymosin.

10. A method as defined in claim 2, wherein said protease is obtained from a recombinant host cell transformed with a nucleic acid encoding said protease.

11. A method as defined in claim 2, wherein said meat after tenderization exhibits a relative shear force of between about 50% and about 90% of said meat prior to tenderization.

12. A method as defined in claim 11, wherein said meat after tenderization exhibits a relative shear force of between about 60% and about 80% of said meat prior to tenderization.

13. A method as defined in claim 2, wherein said contacting comprises injection or marination.

14. A method as defined in claim 13, further comprising tumbling said meat.

15. A method defined in claim 2, wherein said meat is contacted with said protease at a ratio of between about 0.001 arid about 0.05 AU/g meat.

16. A method as defined in claim 2, wherein said meat is selected from the group consisting of fresh meat, frozen meat, freeze-dried meat, and restructured meat.

17. A meat tenderizing composition comprising a tenderizing-effective amount of (i) a protease rendered thermolabile by chemical treatment of the native enzyme; and (ii) one more flavoring agents.

18. A composition as defined in claim 17, wherein said protease has a limited substrate specificity.

19. A composition as defined in claim 17, wherein said protease is derived from a Rhizomucor species.

20. A composition as defined in claim 19, wherein said Rhizomucor species is Rhizomucor miehei.

* * * * *